United States Patent
Morea et al.

(10) Patent No.: US 9,025,952 B2
(45) Date of Patent: May 5, 2015

(54) DETERMINATION OF A MAXIMUM TRANSMISSION DISTANCE FOR HETEROGENEOUS TYPES OF OPTICAL FIBRE

(75) Inventors: Annalisa Morea, Nozay (FR); Florence Leplingard, Vélizy Cedex (FR); Jean-Christophe Antona, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 53 days.

(21) Appl. No.: 13/819,004

(22) PCT Filed: Sep. 29, 2011

(86) PCT No.: PCT/EP2011/067039
§ 371 (c)(1),
(2), (4) Date: Mar. 25, 2013

(87) PCT Pub. No.: WO2012/045664
PCT Pub. Date: Apr. 12, 2012

(65) Prior Publication Data
US 2013/0195444 A1    Aug. 1, 2013

(30) Foreign Application Priority Data
Oct. 5, 2010   (EP) .................................. 10306082

(51) Int. Cl.
*H04B 10/073*    (2013.01)
*H04B 10/07*    (2013.01)

(52) U.S. Cl.
CPC .............. *H04B 10/07* (2013.01); *H04B 10/073* (2013.01)

(58) Field of Classification Search
None
See application file for complete search history.

(56) References Cited

FOREIGN PATENT DOCUMENTS

| CN | 101441070 | 5/2009 |
|----|-----------|--------|
| CN | 101771467 | 7/2010 |
| WO | 2006006748 | 1/2006 |

OTHER PUBLICATIONS

Antona, J.C. et al; Physical design and performance estimation of heterogeneous optical transmission systems; Comptes Rendus—Physique, Elsevier; Paris, France; vol. 9, No. 9-10; Nov. 1, 2008; pp. 963-984; XP026053393; ISSN: 1631-0705; DOI: DOI:10.1016/J.CRHY.2008.11.002.

Antona, J.C. et al; Design and Performance Prediction in Meshed Networks with Mixed Fiber Types; Optical Fiber Communication/National Fiber Optic Engineers Conference; 2008; OFC/NFOEC 2008; Conference on, IEEE, Piscataway, NJ, USA; Feb. 24, 2008; pp. 1-3; XP031391184; ISBN: 978-1-55752-856-8.

(Continued)

*Primary Examiner* — Leslie Pascal
(74) *Attorney, Agent, or Firm* — Patti & Malvone Law Group, LLC

(57) ABSTRACT

An exemplary method is provided for determining a maximum transmission distance for an optical link that has heterogeneous types of optical fiber segments. The method includes retrieving from a database a maximum transmission reach value for each type of optical fiber present in the optical link. A length of each type of the optical fiber to reach a distance is computed, where, for each type of the optical fiber present in the optical link, segments are summed from a starting point to the distance to determine the length of each type of the optical fiber along the optical link. The length for each type of the optical fiber in the optical link is normalized by multiplying the length of each type of the optical fiber by a weight chosen as a function of the maximum transmission reach value for each type of said optical fiber.

9 Claims, 2 Drawing Sheets

(56) References Cited

OTHER PUBLICATIONS

Breuer, D. et al; WDM—Transmission Over Mixed Fiber Infrastructures; Optical Communication, 2002, ECOC 2002; 28th European Conference on Copenhagen, Denmark; Sep. 8-12, 2012; Piscataway, NJ; USA; IEEE; vol. 3, Sep. 8, 2002; pp. 1-2; XP010898164; ISBN: 978-87-90974-63-3.

Anonymous; Calculating Transmission Distance for Fiber Optic Equipment; Internet Article; Jul. 26, 2010; XP002629978; Retrieved from the Internet: URL:http://www.commspecial.jp/assets/application_notesT_21.pdf; retrieved on Mar. 24, 2010.

`US 9,025,952 B2`

DETERMINATION OF A MAXIMUM TRANSMISSION DISTANCE FOR HETEROGENEOUS TYPES OF OPTICAL FIBRE

The technical domain of the invention is the domain of optical communication networks, and particularly the determination of maximum transmission distance for an optical link comprising heterogeneous types of optical fibre.

BACKGROUND ART

In transparent (or partially transparent) optical communication networks, a link between two nodes is most often composed of several segments. A segment is a length composed off a single type of optical fibre. Due to history of network deployment, segments composing a link are not necessarily of the same type. Said types of optical fibre may be, among others, G.652 or G.655 compliant types, such as e.g. Single Mode Fibre, SMF, type or Large Effective Area Fibre, LEAF, type.

For a given minimum quality of transmission, QoT, to know if a transmission can be guaranteed, two methods are actually known and used.

A first method, known as "QoT estimator", is an analytic method. It typically needs all physical characteristics of all optical fibres along a link. Said first method enables a fine knowledge of the QoT, whatever fibre types being used for transmission. Such a method may e.g. use weighted non linear phase, when different types of fibre are used. The major drawback of this first method is the important amount of information typically necessary to compute and that has to be spread out across the control plane of the network.

A second method, known as "max reach", considers, for a given QoT, a maximum length of optical fibre that can be travelled by a signal. Said second method typically requires only knowing a maximum distance a signal can travel through a link before being too distorted and showing an error level too high to comply with said QoT. This rougher second method is typically easier to compute. However, as actually applied, it appears somewhat simplistic in that it is based on the hypothesis that the types of fibre encountered through a link are homogenous. Only one type of fibre is typically considered. To be sure to guarantee said QoT, the single maximum length of optical fibre is determined by considering the most degrading type of optical fibre, even if a link is mainly composed of lesser degrading type of optical fibre. Such a method, for link comprising heterogeneous types of optical fibre typically leads to an undesired result.

If e.g. said method is used to place a regenerator just before said maximum distance is reached through said link, it typically leads to placing more regenerators than required.

SUMMARY

Some embodiments of the invention feature an improvement to said second "max reach" method, taking into account the heterogeneity of the types of optical fibre along a link, without the complexity of the first "QoT estimator" method.

Some embodiments of the invention concern a method, to determine a maximum transmission distance $D_{max}$ for an optical link comprising heterogeneous types of optical fibre segments, comprising:
for a type of optical fibre present in said optical link:
  retrieve a maximum transmission reach,
  determine along said optical link, a length of optical fibre of said type, to reach a distance,
  normalize said length, by multiplying said length by a weight function of said maximum transmission reach,
  sum said normalized lengths for a plurality of types of optical fibre,
  determine the maximum transmission distance of the optical link as the distance for which said sum equals a given threshold.

According to another feature, said lengths, said maximum transmission reaches and said maximum transmission distance are expressed in kilometers of optical fibre.

According to another feature, said lengths, said maximum transmission reaches and said maximum transmission distance are expressed in number of segments of optical fibre.

According to another feature, the weight of optical fibre of a type is equal to the inverse of the maximum transmission reach of said type and said threshold is equal to 1.

According to another feature, a particular type of optical fibre is chosen as a reference type, wherein the weight of optical fibre of a type is equal to the ratio of said maximum transmission reach of said reference type to the maximum transmission reach of said type and said threshold is equal to said maximum transmission reach of said reference type.

According to another feature, the reference type is the type with the maximum maximum transmission reach.

According to another feature, the reference type is the type with the minimum maximum transmission reach.

According to another feature, said weight is stored in a Link Property Information field of an Optical Link Interface record.

Some embodiments of the invention feature an Optical Link Interface record comprising a Link Property Information field associated to a fibre type comprising a weight equal to a constant value divided by a maximum transmission reach of said type.

BRIEF DESCRIPTION OF THE DRAWINGS

Others features, details and advantages of the invention will become more apparent from the detailed illustrating description given hereafter with respect to the drawings on which.

DETAILED DESCRIPTION

Figure 1:
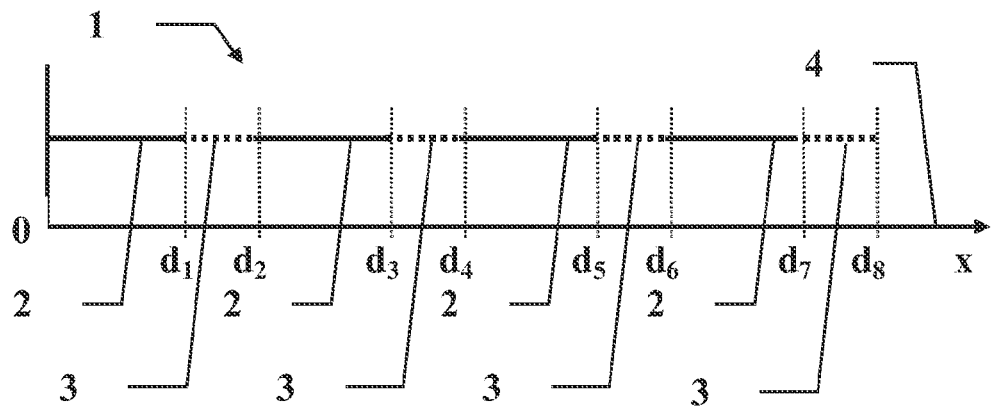
FIG. 1 is an exemplary schematic representation of a link spread along a distance axis.

It is desired to determine a maximum transmission distance $D_{max}$ for an optical link 1. Said optical link 1 comprises heterogeneous types of optical fibre. FIG. 1 shows an example of such an illustrative link 1 comprising two types 2, 3 of optical fibre segments. Type 2 is figured by a continuous line, while type 3 is figured by a dotted line. However, any number of types of optical fibre segments or spans may be encountered through a link 1. As a way to help understanding, let us consider that type 2 segments are of SMF type and that type 3 are of LEAF type. Link 1 of FIG. 1 shows a reciprocation of segments of type 2 and type 3, but any other arrangement is possible.

In the example of FIG. 1, starting from the origin 0, from left to right, the first segment has a length of d1−0=d1, the second segment has a length of d2−d1, the third segment has a length of d3−d2, and so on along the Ox/distance axis.

Figure 3:
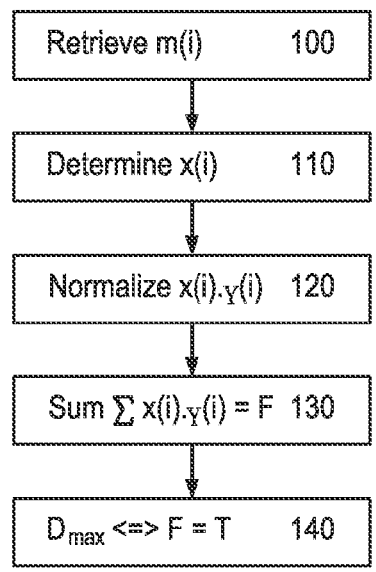
FIG. 3 is an exemplary synopsis of an embodiment of the method.

According to some embodiments of the invention, the method comprises the following steps, also illustrated in the diagram of FIG. 3.

The first three steps 100, 110, 120 are executed for each type i of optical fibre present in said optical link 1. In the example, two types 2, 3 of optical fibre are present, with respectively i=2 and i=3.

Figure 4:
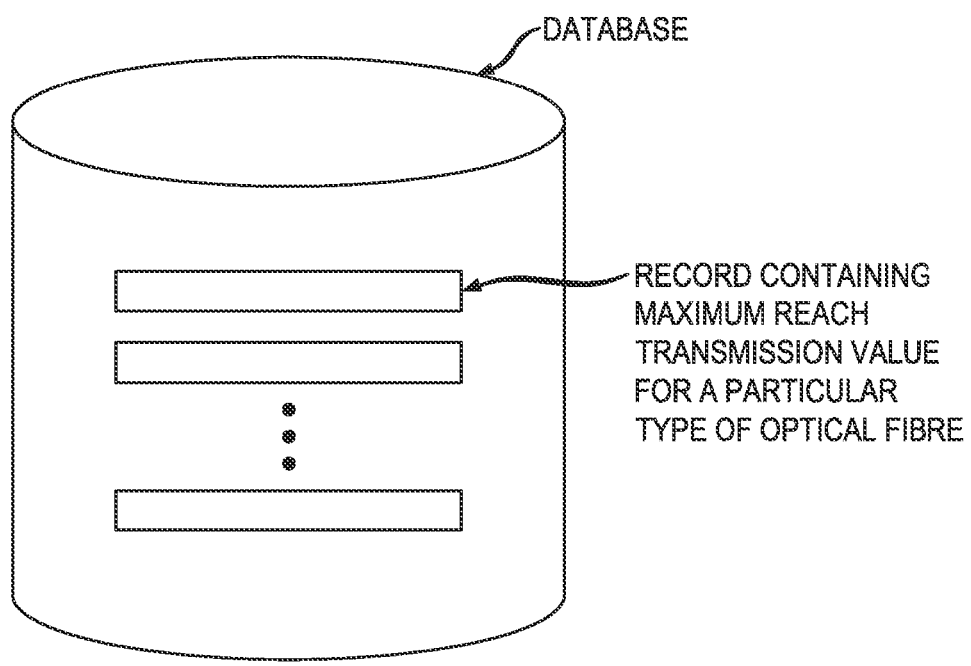
FIG. 4 shows an illustrative embodiment for a network database arranged in accordance with the principles of the invention.

In the first step 100, a maximum reach $M_i$ is retrieved preferably for each type. In the example, since type 2 is SMF, it has an associated maximum reach $M_2$ of SMF type of 2900 km. This is an illustrative value depending of the chosen QoT. With the same QoT, since type 3 is LEAF, it has an associated maximum reach $M_3$ of LEAF type of 1900 km. As can be seen, LEAF type is more distorting than SMF type. Said maximum reach $M_i$ values can be retrieved e.g. from a database stored in the network (See FIG. 4), or alternately computed from the chosen QoT and/or any other characteristics of any network components.

In the second step 110, the length $x_i$ of optical fibre of type i, preferably for each type i, is determined along optical link 1 to reach a distance D, D being varied along the 0x axis. In the example, an illustrative value of D is chosen between $d_4$ and $d_5$. For said distance D, a length $x_2$ must be computed for type 2 optical fibre and a length $x_3$ must be computed for type 3 optical fibre, since these two types 2, 3 are present in the range 0-D. Said lengths $x_2$ and $x_3$ are computed along link 1 from left to right on the FIG. 1 diagram.

From 0 to D, one can find two whole segments (the first and the third) and a partial segment (from the fifth) of type 2. Length $x_2$ is then equal to $d_1$−0, the length of the first segment, plus $d_3$−$d_2$, the length of the third segment, plus D−$d_4$, the length of the partial fifth segment. Finally $x_2$ equals $d_1$+$d_3$−$d_2$+D−$d_4$, corresponding to the total length of type 2 optical fibre between 0 and D along link 1.

From 0 to D, one can find two whole segments (the second and the fourth) of type 3. Length $x_3$ equals $d_2$−$d_1$+$d_4$−$d_3$, corresponding to the total length of type 3 optical fibre between 0 and D along link 1.

Figure 2:
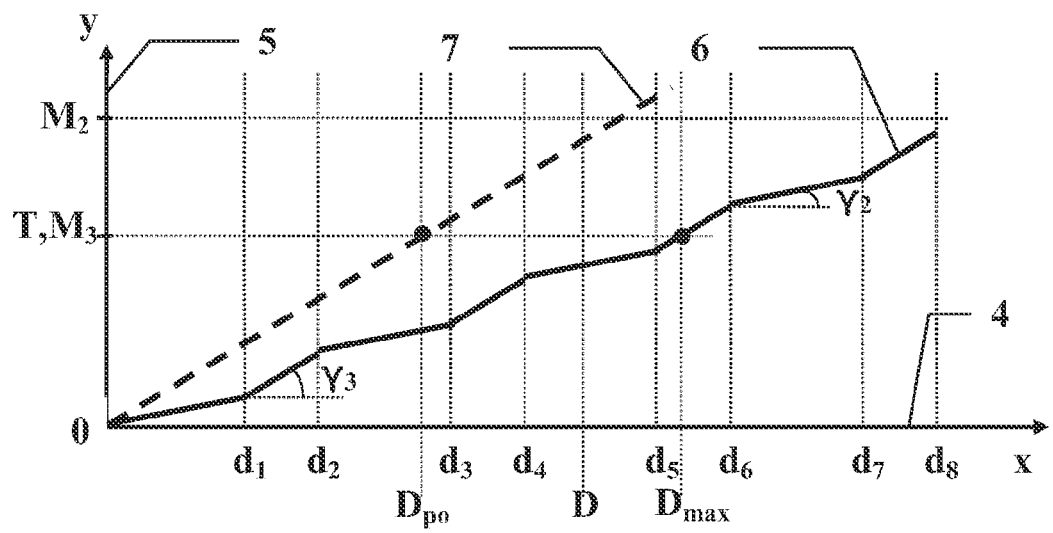
FIG. 2 is an exemplary corresponding diagram indicating the distortion of a signal transmitted over the link along the distance axis of FIG. 1.

FIG. 2 is a diagram indicating the distortion of a signal transmitted over link 1. The Ox/distance axis 4 corresponds to the same as in FIG. 1. The 0y axis 5 indicates the distortion. Said distortion may e.g. be indicated also by a distance. It can be seen on the diagram that the distortion caused by a type 2 fibre is lesser than the distortion caused by a type 3 fibre. On said 0y axis 5 the maximum reach $M_2$ and $M_3$, are respectively indicated associated to type 2 and type 3.

FIG. 2 also shows a graphical representation of an embodiment of the method of the invention.

When applying the "max reach" method according to prior art, only the worst maximum reach among the $M_i$ is considered, that is, $M_3$. Moreover, all optical fibre segments are considered as if they were of the worst (most distorting) type, that is here, type 3. This graphically consists in using the dotted curve/line 7, considering that all segments distort as type 3, and comparing the cumulative distortion figured by curve/line 7 to the worst maximum reach distance of type 3, that is, to $M_3$. By doing so, the maximum distance obtained for the whole link 1 would be $D_{PO}$, far shorter than the $D_{max}$ that can be obtained according to the method of the invention.

When applying the embodiments of the method according to the invention, preferably each and every length of optical fibre is only considered, with respect to the distortion, or what is equivalent, when calculating a distortion equivalent distance, with the exact distortion really caused.

Such a result may be obtained, in a third step 120, by normalizing previously determined, for each type i, lengths $x_i$, by multiplying $x_i$ by a weight $\gamma_i$. Advantageously, said weight $\gamma_i$ is chosen as a function of the maximum transmission reach $M_i$. This is graphically indicated on the curve 6 of the diagram of FIG. 2, by different slopes $\gamma_i$, $\gamma_2$, $\gamma_3$ indicative of the respective contribution of each type 2, 3 of optical fibre to the total distortion. The higher the slope is, the higher the total distortion on 0y axis 5 is. Thus, the higher the slope is, the lower the maximum distance $D_{max}$ that can be reached, measured on the 0x axis 4, for the same limit against $M_3$, measured on the 0y axis 5, is.

In a fourth step 130, preferably all said normalized lengths $x_i \cdot \gamma_i$ along the link 1, from 0 to D, are summed, to determine F, $$F = \sum_i x_i \cdot \gamma_i.$$

This is graphically figured by curve 6 which represents a cumulative distortion.

Finally, in a fifth step 140, the maximum transmission distance $D_{max}$ of the optical link 1 may be determined as the distance D for which said sum F equals a given threshold T. This is graphically illustrated, the threshold T here being equal to $M_3$, by determining the distance $D_{max}$ whose y coordinate on curve 6 equals said threshold value of $M_3$, that is, by intersecting the horizontal line of y coordinate $M_3$, with curve 6, and then reading the x coordinate on 0x axis 4.

Lengths $x_i$, maximum transmission reaches $M_i$ and the maximum transmission distance $D_{max}$ are expressed in homogenous unities in order to be compared. According to a first embodiment, as described until now, they may be expressed in the same length unity, e.g. in kilometers.

Links in (transparent) optical network are most often arranged in spans/segments, with each span/segment being generally of the same length, at least inside each type i of optical fibre. Alternately, according to a second embodiment, the common length unity used to express lengths $x_i$, maximum transmission reaches $M_i$ and the maximum transmission distance $D_{max}$ can be a number of segments of optical fibre. This is equivalent to the first embodiment when considering a mean segment/span length. It is also possible to take into account a mean segment/span length for each type of optical fibre and to add a corrective factor in the respective corresponding weight $\gamma_i$.

According to some embodiments of the invention the weight $\gamma_i$ associated to an optical fibre type i is taken proportional to the inverse $1/M_i$ of the maximum transmission reach $M_i$ of said type i, that is, equal to $A/M_i$, where A is a constant. This allows different types of optical fibre to be compared when it comes to distortion. This is due to the fact that a given length $x_i$ of a type i of fibre, normalized by dividing it by the maximum transmission reach $M_i$ of said type i, is a dimensionless value, increasing from 0, when $x_i$ equals 0 to 1 when $x_i$ equals $M_i$. The ratio $x_i/M_i$ may thus be seen as an indication of the relative contribution of a length $x_i$ of fibre to the distortion. Said ratios may be compared and added to determine a cumulative normalized distortion F caused by several lengths $x_i$ of fibre of heterogeneous types.

Accordingly, the total cumulative distortion ratio $$F = \sum_i A \frac{x_i}{M_i} = A \cdot \sum_i \frac{x_i}{M_i}$$

is kept lesser than A, in order to guarantee the QoT.

According to an embodiment, with A=1, the previous formula is dimensionless. The cumulative distortion ratio thus becomes $$F = \sum_i x_i \cdot \gamma_i = \sum_i \frac{x_i}{M_i}$$

and must verify F<1. Here $\gamma_i=1/M_i$ and the threshold T equals 1. Said embodiment may be interesting in that no fibre type is privileged.

According to another embodiment, a particular fibre type is privileged. Said type is chosen as a reference fibre type ref. The weight $\gamma_{ref}$ associated to said reference type is taken equal to 1. The others weights $\gamma_i$ associated to fiber type i are taken equal to $M_{ref}/M_i$. The threshold T is taken equal to $M_{ref}$. This is equivalent to replace A in the previous formula by $M_{ref}$. The cumulative distortion ratio thus becomes $$F = \sum_i x_i \cdot \gamma_i = M_{ref} \sum_i \frac{x_i}{M_i}$$

and must verify F<$M_{ref}$.

Such a way of processing is similar to take a given fibre type as a distortion reference and to convert any length of non reference type into an equivalent length of reference type based on their relative distortions. The maximum reach $M_{ref}$ then becomes a limit that cannot be crossed if QoT is to be assured. For the other fibre types, their respective lengths are converted by applying a corrective weight $M_{ref}/M_i$ so as to transform them into an equivalent length of reference fibre that would provide the same distortion as the original fibre. By doing so, the corrected lengths can be compared between them and to the reference fibre.

The reference fibre type may be any of the fibre types encountered in the link or in the network. However, some fibre types are more eloquent than other ones.

It is the case for the fibre type with the maximum maximum transmission reach $M_i$, that is, the reference fibre type for which $M_{ref}=\max(M_i)$, or the least distorting fibre type.

It is also the case for the fibre type with the minimum maximum transmission reach $M_i$, that is, the reference fibre type for which $M_{ref}=\min(M_i)$, or the most distorting fibre type. This latter case may be particularly interesting in that it is the fibre type currently used to compute max reach and it may be more intuitive for the operators used to it.

In order to automatically compute a maximum transmission distance, it is interesting to store a value indicative of the relative distortion of a fibre type somewhere in the network in order to be able to retrieve it when needed. Said value indicative of the relative distortion of a fibre type may advantageously be said weight $\gamma_i$. Said weight $\gamma_i$ may be considered in any of its embodiments: $1/M_i$, $M_{ref}/M_i$, $A/M_i$, and being calculated for either kilometric length unity or number of span unity, as soon as the same convention is used for all fibre types. Said value $\gamma_i$, indicative of the relative distortion, is advantageously stored in a Link Property Information, LPI, field of an Optical Link Interface, OLI, record. Said record/field OLI/LPI is known in Generalized Multi Protocol Label Switching, GMPLS, protocol networks, and is attached to a fibre type. Equivalent record/field in other protocols can be found by the one skilled in the art.

Some embodiments of the invention may also concern the modification of current Optical Link Interface record comprising a Link Property Information field associated to a type I, by adding a weight $\gamma_i$ equal to a constant value A divided by a maximum transmission reach $M_i$ of said type i. A is the same constant for all fibre types and may e.g. takes a value among 1, min($M_i$), max($M_i$).

The invention claimed is:

1. A method for determining a maximum transmission distance for an optical link comprising heterogeneous types of optical fibre segments, the method comprising:
   retrieving, from a database, a maximum transmission reach value for each type of optical fibre present in said optical link;
   computing, along said optical link, a length of said optical fibre of each type to reach a distance, wherein, for each type of said optical fibre present in said optical link, segments are summed from a starting point to said distance to determine said length of each type of said optical fibre along said optical link; and
   normalizing said length for each type of said optical fibre in said optical link by multiplying said length of each type of said optical fibre by a weight chosen as a function of said maximum transmission reach value for each type of said optical fibre;
   summing said normalized lengths for a plurality of types of optical fibre; and
   determining said maximum transmission distance of said optical link as said distance for which said sum equals a given threshold.

2. The method of claim 1, wherein said lengths, said maximum transmission reach value and said maximum transmission distance are expressed in kilometers of optical fibre.

3. The method of claim 1, wherein said lengths, said maximum transmission reach value and said maximum transmission distance are expressed in number of segments of optical fibre.

4. The method of claim 1, wherein the weight of said optical fibre of a particular type is equal to the inverse of the maximum transmission reach value of said particular type, and wherein said threshold is equal to 1.

5. The method of claim 1, wherein a particular type of optical fibre is chosen as a reference type, and wherein the weight of said optical fibre of said type is equal to a ratio of said maximum transmission reach value of said reference type to the maximum transmission reach value of said reference type, and wherein said threshold is equal to said maximum transmission reach value of said reference type.

6. The method of claim 5, wherein said reference type has a maximum maximum transmission reach value.

7. The method of claim 5, wherein said reference type has a minimum maximum transmission reach value.

8. The method of claim 4, further comprising storing the weight in a Link Property Information field of an Optical Link Interface record.

9. The method of claim 1, wherein the computing step is performed via a graphical analysis.

* * * * *